United States Patent [19]
Wadsworth-Dubbert et al.

[11] Patent Number: 5,822,860
[45] Date of Patent: Oct. 20, 1998

[54] INTEGRALLY RETAINED BEARING RACE WITH IMPROVED TWISTING RESISTANCE

[75] Inventors: Debbie Sue Wadsworth-Dubbert, Port Clinton; Douglas Arnold Michel, Sandusky; Jeffrey Steven Kessen, Huron; Charles Alan Price, Sandusky, all of Ohio

[73] Assignee: General Motors Corporation, Detroit, Mich.

[21] Appl. No.: 777,921

[22] Filed: Dec. 23, 1996

[51] Int. Cl.⁶ .................................................. B23P 15/00
[52] U.S. Cl. ........................................................ 29/898.061
[58] Field of Search .................. 29/898.061, 898.062, 29/521, 509, 513, 898.07; 384/906, 255, 537

[56] References Cited

U.S. PATENT DOCUMENTS

| | | |
|---|---|---|
| 4,179,167 | 12/1979 | Lura et al. .......................... 308/189 A |
| 4,958,944 | 9/1990 | Hofmann et al. ....................... 384/512 |
| 4,986,607 | 1/1991 | Hofmann et al. ..................... 301/124 R |
| 5,061,090 | 10/1991 | Kriaski et al. ........................... 384/537 |
| 5,226,738 | 7/1993 | Valette et al. ............................ 384/513 |
| 5,240,333 | 8/1993 | Hassiotis et al. ........................ 384/448 |
| 5,490,732 | 2/1996 | Hofmann et al. ........................ 384/537 |
| 5,536,075 | 7/1996 | Hertetti ................................. 301/105.1 |

*Primary Examiner*—Carl E. Hall
*Assistant Examiner*—Christopher Goins
*Attorney, Agent, or Firm*—Patrick M. Griffin

[57] ABSTRACT

An improved method for retaining a separable bearing race to a inner bearing member and also preventing twisting of the separable race on the spindle. The circular corner edge where the cylindrical inner surface of the separable race would otherwise intersect with the annular, axial face of the race is machined off with a chamfer that is eccentric to the co axis of the race and spindle. Then, a deformable lip of the spindle is deformed in and over the face of the race, concurrently filling in the eccentric chamfer. When the race thereafter attempts to turn on the spindle, a wedging action is created by the eccentric chamfer to prevent twisting.

3 Claims, 3 Drawing Sheets

INTEGRALLY RETAINED BEARING RACE WITH IMPROVED TWISTING RESISTANCE

TECHNICAL FIELD

This invention relates to methods of bearing manufacture and assembly, and specifically to a two row ball bearing of the type in which a separable race is integrally retained to a central spindle with improved resistance to turning of the separable race on the spindle.

BACKGROUND OF THE INVENTION

Bearings in which an inner race or spindle is supported within a surrounding outer race or hub by two axially spaced rows of rolling elements provide superior axial stiffness and load support. As a consequence, they are almost universally used for automotive wheel bearings, driven or non driven. The two rows of rolling elements are most often bearing balls, in modern designs, with convergent, angular contact pathways.

The manufacturer of two row ball bearings that support heavy loads must deal with the issue of retaining at least one separable ball race to the spindle. This is because, while it is simple to load a full complement of balls into the first row, the second row will have to have one pathway that is axially removable. Otherwise, the second row would have to be loaded with a technique such as radially displacing the spindle and hub and then loading the balls into the locally widened space so created. This allows for only a less than full complement of balls in the last installed ball row, which would drastically reduce load capacity. With a separable race, a full ball complement is achieved, but two other issues must be dealt with. The separable race must be installed so as to maintain a proper bearing preload or endplay and must be securely retained axially to the end of the spindle. In some older methods of assembly, both considerations are handled by the same structure. For example, a simple threaded nut can be torqued down against the separable race, pushing it axially against its ball row until the proper bearing preload is achieved. If the nut can be prevented from backing off by an adequate locking means, it both maintains the preload and retains the race. Nut locking is difficult to assure, however.

A more accurate and secure, if more complex system is disclosed in co assigned U.S. Pat. No. 4,179,167 issued Dec. 18, 1979 to Lura et al. A separable race slides onto the outer surface of the spindle freely until it hits the outer ball row. As it makes contact with the outer ball row, its outer edge rests past the inner wall of a groove machined into the spindle. The separable race is forced and held against its ball row by an assembly apparatus to the desired preload, and then the axial spacing of its outer edge from the outer wall of the groove is accurately gauged. Then, a pair of selected thickness keeper rings, chosen from a pre machined assortment, are tightly inserted between the outer edge of the separable race and the far wall of the spindle groove. The keeper rings hold the proper race location and so maintain the preload or end play as desired. Finally, a sleeve shaped retaining ring must be swaged down over the keeper rings to hold them radially down into the groove. While this assembly method has proved a solid and robust design for years, a less costly system, in terms of parts, assembly steps, or both, would be very desirable, if it could provide the same preload accuracy and durability.

The simplest possible separable race retention system, at least in terms of the total number of parts, would be one that used some portion of the spindle material itself to retain the separable race instead of a separate component, such as a nut or keeper rings. One such process that has received a good deal of attention in patents world wide is the so called cold forming or "riveting" process, in which a cylindrical lip on the end of the spindle is cold formed axially inwardly and spread radially outwardly into an annular bead that abuts and overlies the outer edge of the separable race. The separable race is thereby prevented from pulling axially off of the spindle. How solidly and securely the separable race is retained to the spindle is a function not only of the degree of radial overlap between the bead and the outer edge of the race, but also a function of the continuity of contact between the inner mounting surface of the separable race and the outer support surface of the spindle. Their mutual contact interface should be both tight and continuous, that is, with no radial gap.

Even when continuous, gap free mutual contact between the mating surfaces of the separable race and the spindle is achieved, however, the problem remains of preventing the separable race from turning or twisting on the spindle under bearing load. A smooth surface to surface contact resists turning only by virtue of the tightness and pressure of contact at the interface, which may work loose with time. One design deals with the race turning problem with teeth or splines machined into the edge of the separable race. The deformed bead of the spindle interlocks with the teeth, resisting race turning better than a simple friction fit between smooth surfaces would do. The main drawback of such a system is the cost and difficulty of machining in separate splines or teeth. Such a system is disclosed in FIG. 1. Spindle 10 has a bead 12 deformed in and over a face or edge 14 or separable race 16. Regular splines or teeth 18 machined into edge 14, shown by dotted lines, are filled in by the material of the deformed bead 12, providing twisting resistance. Each tooth 18 has to be individually cut, however.

SUMMARY OF THE INVENTION

The invention provides improved twist resistance to a separable bearing race without the necessity for machining a series of separate splines or teeth.

In the preferred embodiment disclosed, a deformable annular lip of conventional thickness and shape is provided on the end of the spindle. A shoulder is machined on the spindle to abut the inner edge of the separable race while leaving a conventional length of the lip "unsupported," that is, extending axially past the race outer edge, which is later deformed into a race retaining bead. The radially inner edge of the axially outwardly directed face of the inner race is then machined with an eccentric chamfer. The width of the chamfer varies continuously over 360 degrees, from a minimum to a diametrically opposed maximum and back. When the bearing is assembled, the separable race is installed by a tight press fit onto the spindle and against the shoulder, and its pathway is ground and carefully gauged in the installed position. The unsupported, remaining length of the lip is then conventionally headed over, pressed and rolled axially inwardly and radially outwardly over the separable race's eccentric chamfer, which is filled by and contacted continuously by the deformed bead. In operation, any tendency of the separable race to turn on the spindle is strongly resisted by the eccentric chamfer, which creates a continuous wedging effect.

BRIEF DESCRIPTION OF THE DRAWINGS

These and other objects of the invention will appear from the following written description, and from the drawings, in which.

DESCRIPTION OF THE PREFERRED EMBODIMENT

Figure 5:
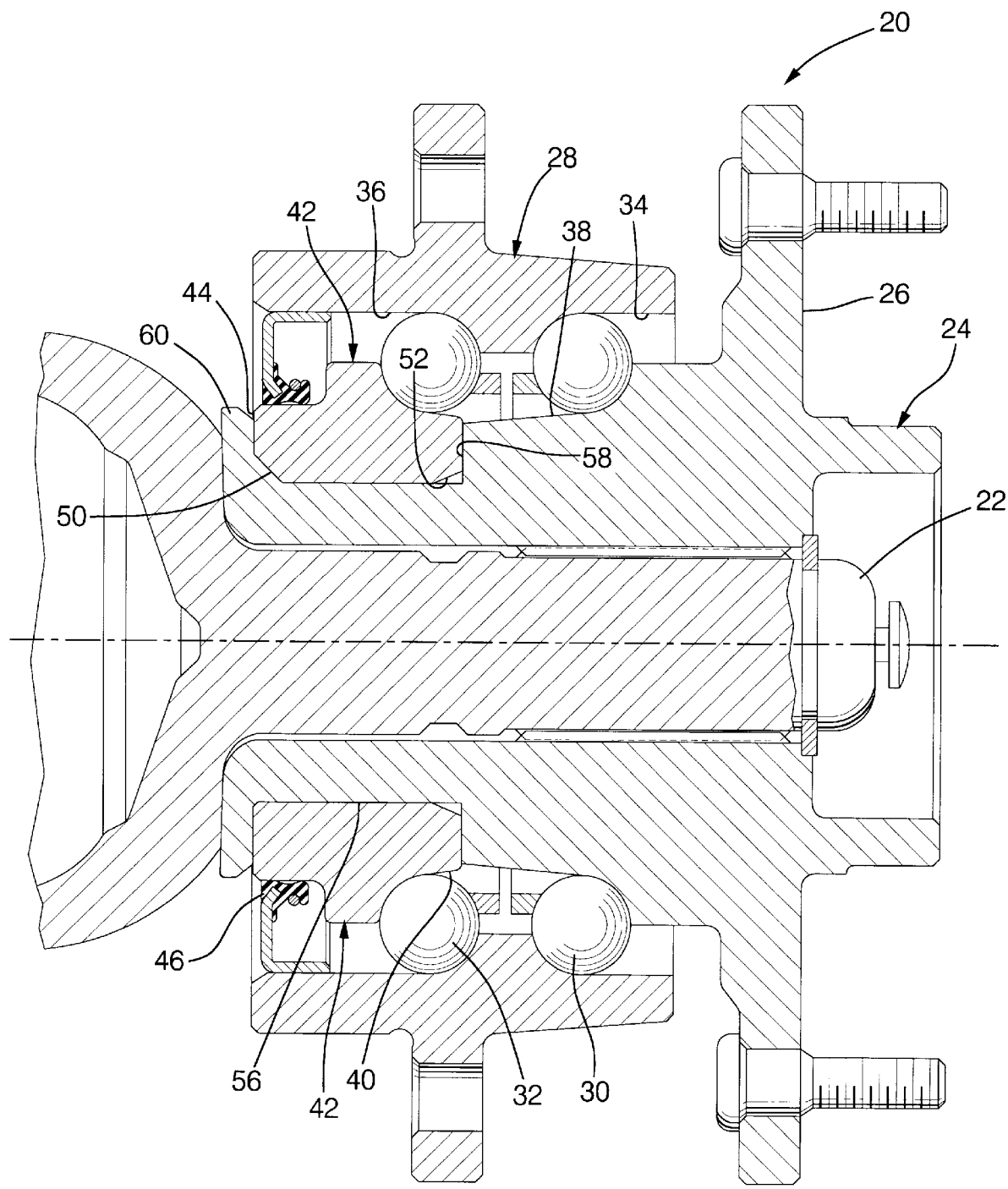
FIG. 5 shows a completed bearing attached to a drive shaft.

Referring first to FIG. 5, a vehicle wheel bearing made according to the invention is indicated generally at 20. Bearing 20, as shown, is a driven bearing, meaning that a drive shaft 22 passes through it, specifically through the splined, hollow center of the inner race or "spindle", indicated generally at 24. However, it could just as easily be a non driven, trailing bearing. Either way it is spindle 24 that rotates and carries the wheel attachment flange 26 at its outboard end. The outer race or "hub", indicated generally at 28, is stationary and bolted to the non illustrated vehicle suspension.

Figure 1:
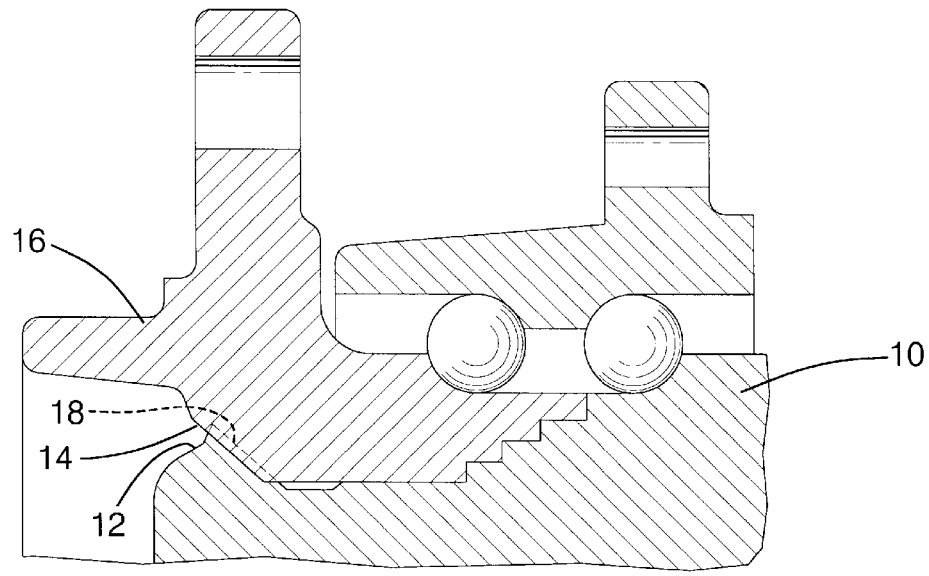
FIG. 1 is a cross section of a bearing incorporating teeth machined into the face of the race, as described above.
Figure 2:
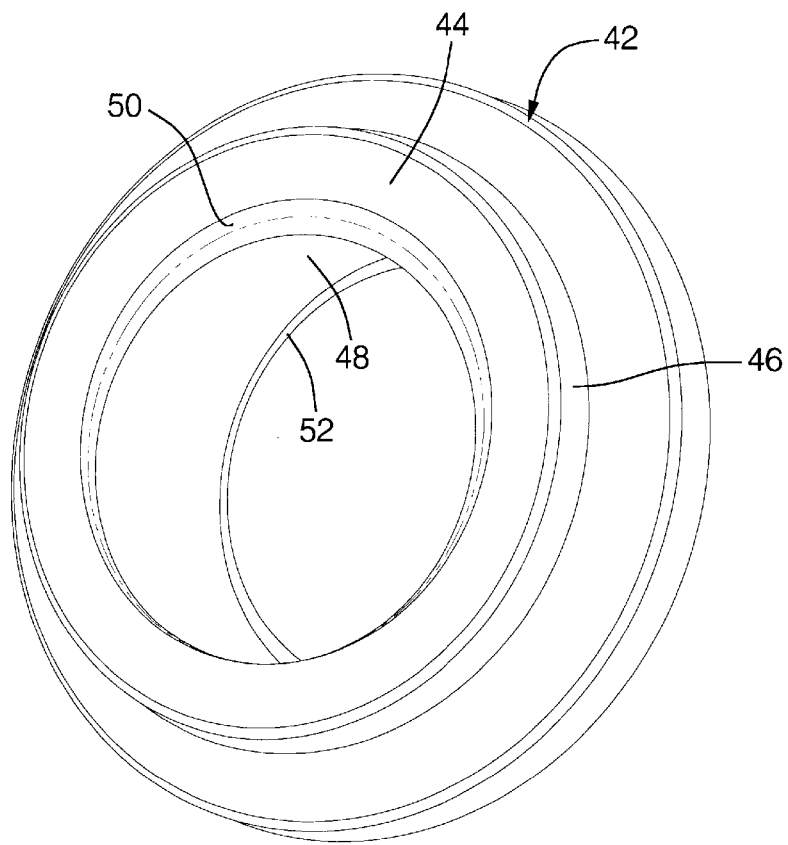
FIG. 2 is a perspective view of the separable race alone, showing the eccentrically chamfered inner edge of the race face.
Figure 3:
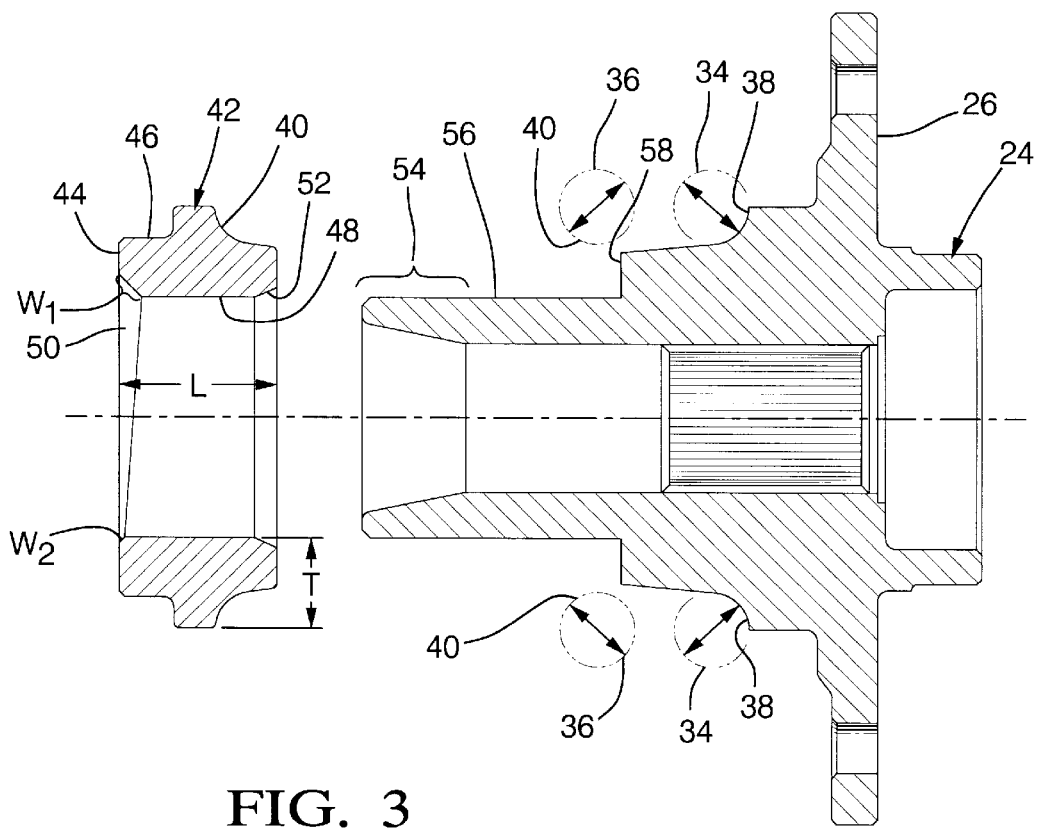
FIG. 3 shows the separable race removed from the spindle, with the spindle lip in an undeformed state and the separable race removed.

Referring next to FIGS. 2 and 3, two ball rows, an outboard ball row 30 and inboard ball row 32, are full complement and axially spaced apart, so as to provide good load support and axial stiffness. The ball rows 30 and 32 run on two pairs of convergent angular contact pathways. These are an outboard outer pathway 34 and inboard outer pathway 36, both ground integrally into hub 28, an outboard inner pathway 38, ground integrally into spindle 24, and an inboard inner pathway 40. Inboard inner pathway 40 is ground into a separable, generally ring shaped race, indicated generally at 42. Separable race 42 is only as axially long and as radially thick as is necessary just to provide the inboard inner pathway 40 for the last installed ball row 32. As disclosed, the axial length L is approximately 16 mm, and radial thickness T approximately 8 mm. a consequence, its outer face 44 is close to its pathway 40, little more than a ball diameter away. Furthermore, as is typical, race 42 is actually thinned down at face 44 to provide a seal running surface 46. The inner surface 48 of race 42 is cylindrical, but for an eccentric chamfer 50, which cuts off some of the sharp cornered edge (shown by the dotted circle in FIG. 2) where annular outer face 44 would otherwise have merged with race inner surface 48. Specifically, eccentric chamfer 50 has a radial width that extends continuously over 360 degrees, from a maximum W1 to a diametrically opposed minimum W2, and back. This, of course, would be considered a defect in a conventional chamfer, which is generally provided just for clearance, or to dull an otherwise sharp edge. In fact, a conventional clearance chamfer 52 is provided here, at the edge of the opposite face of race 42, which is conventionally formed, and has a constant width. Eccentric chamfer 50, on the other hand, would be machined by chucking the race 42 in a lathe type tool so as spin slightly off center. The degree of eccentricity between the axis of spinning/cutting and the axis of the race 42 itself need not be great, and a difference of less than 1% of the diameter of the edge being chamfered will suffice. A stationary cutter bit would engage the sharp cornered edge, skiving off material in an eccentric fashion to leave the chamfer 50 as shown. The angle of the chamfer 50 itself could range between forty and fifty degrees, for example, although that angle is not as important as the slight eccentricity itself. Other tools, such as a grinder, could be used, but a stationary cutting bit would work very simply and efficiently.

Still referring to FIG. 3, spindle 24 is already hollow through the center, and is therefore easily provided with a deformable lip 54. Lip 54 is really just a sleeve like extension of the cylindrical support surface 56 of the hollow spindle 24, and therefore has the same diameter initially as surface 56, but really has no discrete, individual axial length per se. If the spindle were solid, as in a trailing bearing, then the lip would be formed by a central bore cut into the axially inner end of the spindle, and the lip would have a discrete, individual axial length. Lip 54 is also tapered slightly over its inner surface to make it more easily deformed. A stop shoulder 58 is machined perpendicular to spindle outer surface 56, and is located inboard of the integral outboard inner pathway 38. In FIG. 3, the installed, final position of the three other pathways, 34, 36 and 40 is indicated in dotted lines for comparison, and the contact angles therebetween are shown by double headed arrows.

Still referring to FIG. 3, before the final assembly of bearing 20, separable race 42 is initially and temporarily press fitted tightly onto and over the inboard end of spindle 24 until its inner edge abuts the stop shoulder 58. The interference fit between the race mounting surface 48 and spindle support surface 56 is so tight that a fairly powerful ram apparatus, or alternate chilling and heating of the respective parts, or some combination thereof, would be necessary to carry out the initial installation. Then, both inner pathways 38 and 40 are ground at once, as if the spindle 24 and race 42 were one integral part. Concurrently, both outer pathways 36 and 34 are ground into hub 28. Before separable race 42 is removed again, the ground pathways 38 and 40 are gauged relative to a standard reference frame, as are the pathways 34 and 36 on hub 28. Then, suitable size balls 30 and 32 are chosen so as to fit up between the opposed pathways 34–38 and 36–40 respectively with the desired axial preload or end play. The nominal ball diameter here is 11.11 mm, but that may vary up or down from bearing to bearing, depending on how the pathways gauge out. Then, race 42 is removed with a suitable pulling apparatus. Next, the outboard ball row 30 is installed against the outboard inner pathway 38 of spindle 24, and hub 22 is moved freely over spindle 24 until its outboard pathway 34 hits the outboard ball row 30. There is no problem in making the outboard ball row 30 a full complement, of course, because there are no physical barriers to free ball entry. Then, the full complement inboard ball row 32 is installed against the inboard ball pathway 36 of hub 28 which is possible since the separable race 42 is not yet installed or in the way. Next, the separable race 42 is reinstalled, making the same tight press fit over the spindle support surface 56, and pushed with the same ram apparatus (or other technique) until it abuts stop shoulder 58. The chamfer 52 on the inner edge of race 42 assures a good, flat to flat contact with the stop shoulder 58. At this point, because of the tight press fit of race 42, the desired preload or axial end play is created, based on the grinding, gauging, and ball selection steps already carried out. It remains only to assure that race 42 is axially retained to spindle 24 and snug against stop shoulder 58 without jeopardizing the close, continuous press fit of the two surfaces 56 and 48.

Figure 4:
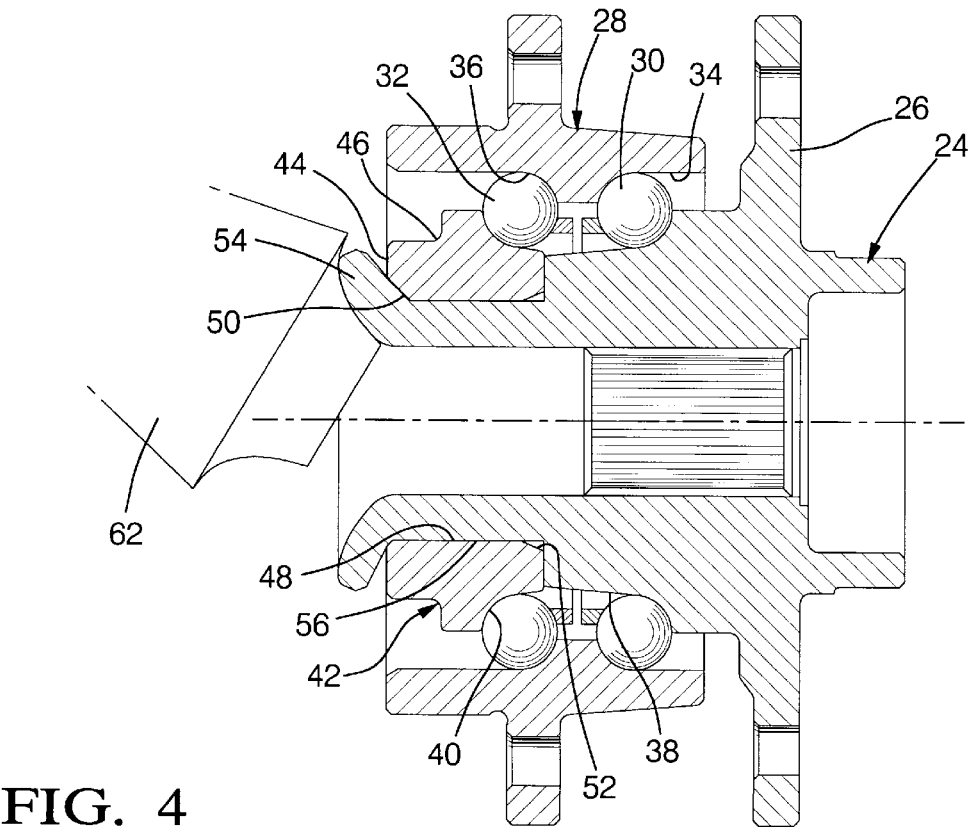
FIG. 4 shows the lip in the process of being deformed.

The retention of race 42 to spindle 24 is illustrated in FIG. 4. It should be kept in mind that while the outer diameter of the spindle's cylindrical support surface 56 and the inner diameter of the separable race's cylindrical mounting surface 48 are close enough to make a very tight interference fit, as noted above, there is still the possibility that, after installation, race 42 could twist on the spindle 24, due to the force of the ball row 32 running on it. Eccentric chamfer 50 is designed to resist and prevent such twisting. As illustrated, the retention of race 42 is achieved by "heading over" or roll forming the lip 54 with the conventional roll forming tool shown at 62, which is rocked or "orbited" around the centerline of bearing 20 and pushed down forcefully at the same time. Bearing 20 and spindle 24 are supported in a non illustrated solid base during this operation. Concurrently, lip 54 is forced axially inwardly and rolled radially outwardly, gradually deforming it into the bead 60 described above. Lip 54 need not have any particular radial thickness, hardness, taper angle, or unsupported length to start. Lip 54 simply needs enough unsupported material extending past the race outer face 44 (and enough radial thickness) to allow it to be deformed into a bead 60 with sufficient strength and radial width to axially retain race 42. That would be true for any lip deformed into a race retaining bead, and the exact dimensions needed will vary from case to case. While bead 60 must conform closely the race outer face 44 and cover almost all of its radial width to give good retention, it need not be forced against the race outer face 44 with any particular pressure, since it is not intended to establish or maintain bearing preload, in the way that a tightened retention nut might. That preload is already set, and bead 60 simply provides axial retention. Any axial force it did apply to race 42 would be absorbed through the stop shoulder 58, and not directly through the ball rows. As shown, the material of bead 60 will also conform to and "fill" the eccentric chamfer 50. In fact, it will do so more easily and with more assurance of intimate surface to surface contact than it could fill in the gaps between closely spaced individual teeth or splines.

Referring next to FIG. 5, the completed bearing 20 is attached to drive shaft 22 by a snap ring or other fastener. In operation, as the ball race 32 rides on pathway 40, transferred torque could tend to twist the race 42 around and on spindle 24, like a plane bushing on a shaft. However, the surface of eccentric chamfer 50 will strongly resist any such turning, because it is not coaxial to the race 42 or spindle 24. As the race 42 tried to turn, eccentric chamfer 50 would attempt to turn into and past the matching surface of the deformed bead 60. Because of the non coaxial nature of chamfer 50, a strong wedging force would resist and prevent it's turning, in either direction, on spindle 24.

Variations in the embodiment disclosed could be made. The chamfer 50 is shown as being radially continuous, that is, disclosed as being a single chamfer with a single surface and single angle. It could, if desired, be broken down into a series of two or more mutually intersecting chamfers of progressively increasing angle, extending over a longer axial length and greater radial width. This would create less stress as the bead material would be deformed less sharply over into the less steep, progressive sections of the double chamfer. The final wedging effect would be the same and, potentially, even greater, because of the greater surface area involved. If desired, the edges where the chamfer 50 merges into the race face 44 and/or the race inner surface 48 could be slightly radiused again, to reduce sharp transition stress in the deformed bead. Therefore, it will be understood that it is not intended to limit the invention to just the embodiment disclosed.

It is claimed:

1. A method for assembling a bearing having an inner spindle with a central axis, a surrounding outer hub, a pair of axially spaced rows of rolling bodies supporting said spindle and hub for coaxial rotation, with one of said rows running on a generally ring shaped separable race having a cylindrical mounting surface that press fits coaxially to said spindle over a cylindrical support surface on said spindle and which is subject to turning on said support surface, said race having an axial outermost annular face that intersects said mounting surface at a circular edge, said method comprising the steps of;

provridirig a radially outwardly and axially inwardly deformable annular lip on said spindle axial end having an outer diameter substantially equal to said spindle support surface, providing the circular edge intersection of said separable race outer face and cylindrical mounting surface with a generally conical chamfer that is eccentric to said central axis of both said separable race and spindle, installing said separable race over said spindle with said race mounting surface and spindle support surface closely engaged and with said annular lip extending axially beyond said race outer face, deforming said spindle annular lip axially inwardly and radially outwardly sufficiently to form a bead that closely abuts said race outermost face and conforms to and fills said eccentric chamfer, whereby, said separable race is both axially retained to said spindle and also prevented from turning relative to said spindle about said central axis by virtue of said deformed annular lip filling said eccentric chamfer and providing a wedging effect to resist relative turning.

2. The method according to claim 1 further characterized in that said eccentric chamfer is circumferentially continuous.

3. The method according to claim 1 further characterized in that said eccentric chamfer is radially continuous.

* * * * *